United States Patent [19]
Parsons

[11] Patent Number: 5,289,734
[45] Date of Patent: Mar. 1, 1994

[54] MANUAL TRANSMISSION SHIFTER ASSEMBLY WITH REVERSE INHIBITOR

[75] Inventor: George A. Parsons, Grosse Pointe, Mich.

[73] Assignee: New Venture Gear, Inc., Troy, Mich.

[21] Appl. No.: 954,328

[22] Filed: Sep. 30, 1992

[51] Int. Cl.⁵ ............................................. F16H 61/18
[52] U.S. Cl. ........................................................ 74/476
[58] Field of Search ........................................... 74/476

[56] References Cited

U.S. PATENT DOCUMENTS

| | | | |
|---|---|---|---|
| 1,250,355 | 12/1917 | Robinson et al. | 74/476 |
| 4,018,099 | 4/1977 | O'Brien et al. | 74/476 X |
| 4,275,614 | 6/1981 | Okubo et al. | 74/476 |
| 4,324,150 | 4/1982 | Kawamoto | 74/476 |
| 4,633,728 | 1/1987 | May | 74/476 |
| 4,638,678 | 1/1987 | Gorman et al. | 74/476 |
| 4,738,153 | 4/1988 | Sabel | 74/476 |
| 5,036,722 | 8/1991 | Park | 74/476 |
| 5,101,680 | 4/1992 | Parsons | 74/475 |

Primary Examiner—Allan D. Herrmann
Attorney, Agent, or Firm—Harness, Dickey & Pierce

[57] ABSTRACT

A shifter assembly is disclosed for use with a manually-operated multiple-speed ratio transmission. The shifter assembly includes a tower housing fixed to the transmission casing, and a shift lever operably coupled to the gearshift mechanism housed within the transmission casing and which is supported for movement within the housing under the control of a vehicle operator. A shift inhibitor device is located within the housing and is operable for inhibiting movement of the shift lever from the highest forward gear position into the reverse gear position. In addition, the shift inhibitor device is also adapted to guide the shift lever into a "Neutral" position.

11 Claims, 3 Drawing Sheets

MANUAL TRANSMISSION SHIFTER ASSEMBLY WITH REVERSE INHIBITOR

BACKGROUND OF THE INVENTION

The present invention relates generally to gearshift mechanisms for use in manual transmissions and, more particularly, to a shift inhibitor apparatus that is integrated into the shifter assembly for preventing a vehicle operator from shifting into the reverse gear position in certain circumstances.

As is known, conventional manual transmissions are typically equipped with a shifter assembly for permitting a vehicle operator to selectively shift between various forward ratio gears and a reverse gear. The shifter assembly includes a tower housing secured to an exterior surface of the transmission casing and a shift lever that is operably coupled to a gearshift mechanism located within the transmission casing. Typically, the gearshift mechanism has a standardized shift pattern such that the shift lever is linearly movable along a "Neutral" path to a plurality of preselected "gate" position, each of which defining a shift plane for a pair of the ratio gears. Most commonly, a gate position located at one end of the Neutral path defines the shift plane between the highest forward ratio gear position (i.e., 5th gear) and the reverse gear position. To prevent the vehicle operator from inadvertently down-shifting along this shift plane from the highest forward gear position into the reverse gear position, it is known to "block" such a shift by installing a shift inhibitor device in conjunction with the gearshift mechanism.

One example of a shift inhibitor device of the type installed within the manual transmission and in relatively close proximity to the gearshift mechanism is shown in U.S. Pat. No. 4,738,153 to Sabel. Alternatively, it is known to mount a shift inhibitor device to an exterior surface of the transmission casing, such arrangements being shown in U.S. Pat. No. 4,638,678 to Gorman and U.S. Pat. No. 5,101,680 to Parsons. However, each of the afore-noted shift inhibitors can not be readily installed on existing or otherwise standard manual transmissions without requiring costly redesign and rework.

While conventional shift inhibitors perform satisfactorily, the need exists to develop a shift inhibitor that can be easily adapted for application to virtually any existing high-volume manual transmission.

SUMMARY OF THE INVENTION

Thus, the present invention is directed to overcoming the disadvantages commonly associated with conventional shift inhibitors by providing an improved shift inhibitor device that is integrated into the shifter assembly and which can be used with virtually any standard manually-controlled gearshift mechanism.

As a related object, the shift inhibitor device of the present invention uses only a minimal number of components that can be simply manufactured and easily pre-assembled into a modular shifter assembly.

In accordance with a preferred embodiment of the present invention, a shifter assembly is disclosed for use with a manually-operated multiple-speed ratio transmission. The shifter assembly includes a tower housing fixed to the transmission casing, and a shift lever operably coupled to the gearshift mechanism housed within the transmission casing and which is supported for movement within the housing under the control of a vehicle operator. A shift inhibitor device is located within the housing and is operable for inhibiting movement of the shift lever from the highest forward gear position into the reverse gear position. In addition, the shift inhibitor device is also adapted to guide the shift lever into a "Neutral" position.

Additional objects, advantages, and features of the present invention will become apparent from the following description and appended claims, taken in conjunction with the accompanying drawings.

DETAILED DESCRIPTION OF THE PREFERRED EMBODIMENTS

Figure 1:
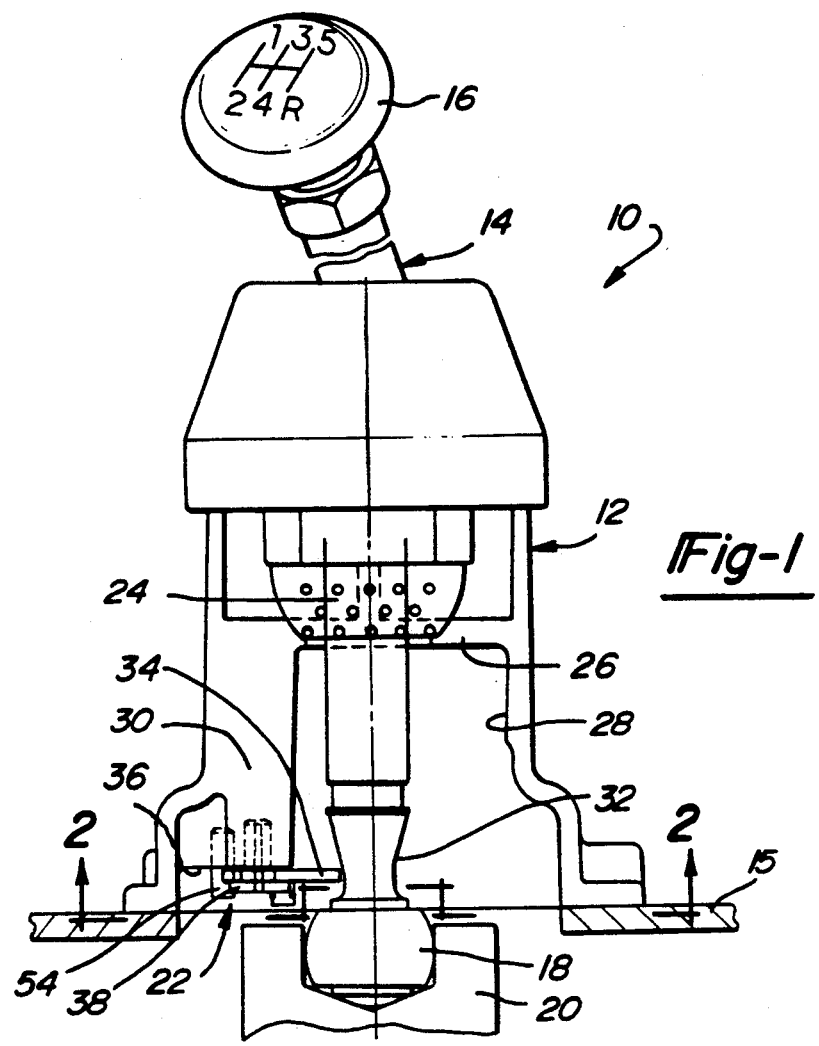
FIG. 1 is a side elevation view of a shifter assembly having an improved shift inhibitor device incorporated therein.

In general, the present invention is directed to a shifter assembly 10 of the type used in conjunction with a conventional gearshift mechanism for permitting a vehicle operator to selectively shift a multi-speed manual transmission. Referring to FIG. 1, shifter assembly 10 includes a tower housing 12 and a shift lever 14 partially disposed within housing 12 for sliding and angular movement under the control of a vehicle operator. Shift lever 14 has a first end on which a shifter knob 16 is mounted and a second end forming a generally spherical ball portion 18 that is shown retained in a movable socket portion 20 of a shift selector member (not shown) of the type commonly associated with a standard or otherwise conventional gearshift mechanism. Finally, shifter assembly 10 also includes a shift inhibitor device 22 that is operably located between shift lever 14 and housing 12.

Housing 12 is secured to a transmission casing 15 which houses a plurality of conventional transmission components, not shown. As is known, these components include gear members which establish drive ratios between the input and output shafts of the transmission. Since the novel features of the present invention are not directed to the particular construction of any specific manual transmission, it is not believed that further description thereof is necessary. However, shifter assembly 10 is particularly well-suited for use in automotive manual transmissions of the type having a shift pattern wherein shift lever 14 is movable along a "Neutral" path to a plurality of "gate" positions for permitting the vehicle operator to selectively shift between pairs of ratio gears. In one gate position, shift lever 14 can be selectively moved from the Neutral path in a first direction to a high forward gear position and in a second direction to a reverse gear position. Such an arrangement is commonly associated with a 5-speed manual transmission wherein the above-noted gate position corresponds to a shift plane defined between the fifth ratio gear position and the reverse gear position. As will be explained hereinafter in greater detail, shift inhibitor device 22 is adapted to prevent the vehicle operator from moving shift lever 14 from the fifth ratio gear position into the reverse gear position.

Figure 2:
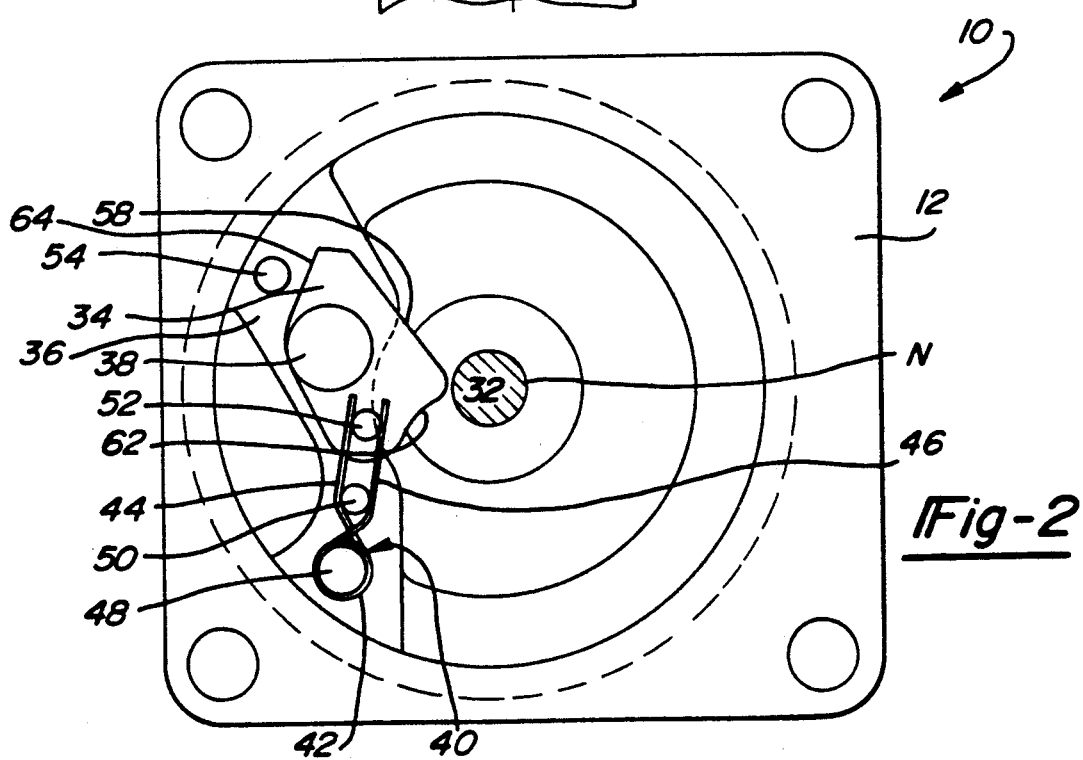
FIG. 2 is a bottom view, taken along line 2—2 of FIG. 1, showing the shift inhibitor device in a "Home" position with the shift lever in a "Neutral" position.

As best seen from FIGS. 1 and 2 of the drawings, housing 12 is shown to support shift lever 14 therein for movement in a known manner. Shift lever 14 is an elongated shaft having an intermediate portion 24 supported for movement from a horizontal flange portion 26 of housing 12. Moreover, housing 12 forms a recessed portion below flange portion 26 for defining a chamber 28 within which shift inhibitor device 22 is located. Shift inhibitor device 22 is shown to be supported from a vertically extending lug portion 30 of housing 12 so as to be selectively engagable with a recessed neck segment 32 of shift lever 14. Thus, shift inhibitor device 22 is remotely located from both the gearshift mechanism and the transmission housing. As such, shift inhibitor device 22 can be simply pre-assembled into shifter assembly 10. A novel feature of shifter assembly 10 is its modular construction, wherein shifter assembly 10 can be operably coupled to the existing gearshift mechanism of virtually any multi-speed manual transmission without the requirement of significant rework and modification to either of the manual transmission or the gearshift mechanism. In addition, the relatively simple structure and operational orientation of the components associated with shift inhibitor device 22 significantly reduces the manufacturing and assembly related cost associated therewith as compared to conventional shift inhibiting devices.

Figure 3:
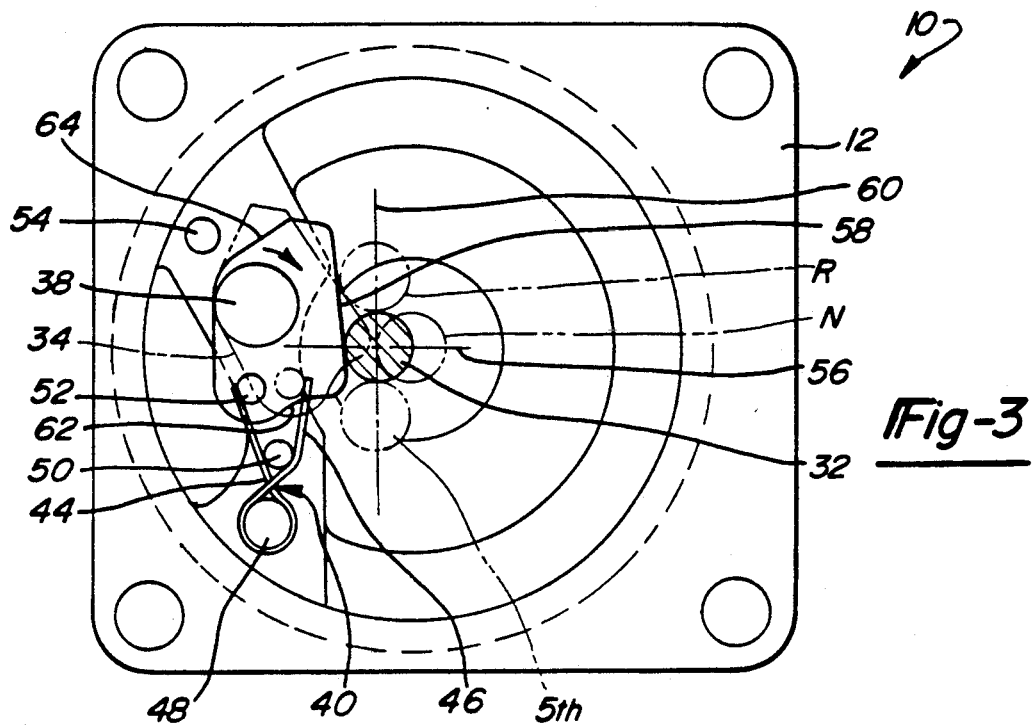
FIG. 3 is a view, similar to FIG. 2, showing the shift inhibitor device moved to a first engagement position in response to initial movement of the shift lever.
Figure 4:
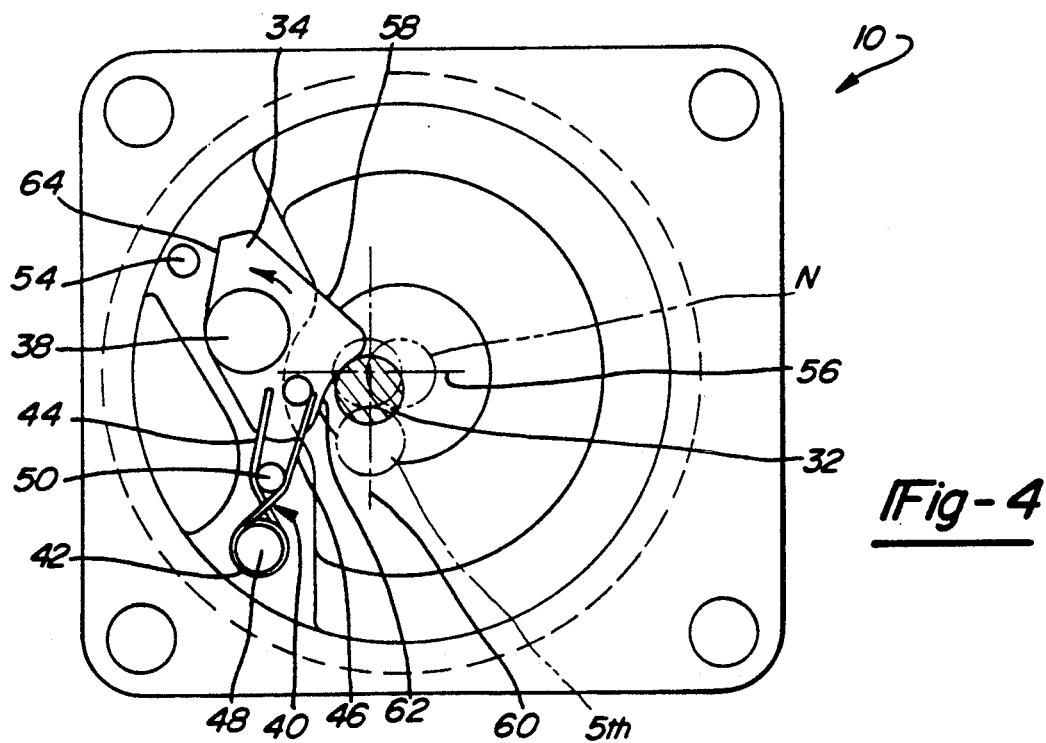
FIG. 4 shows the shift inhibitor device moved to a second engagement position in response to movement of the shift lever out of a highest forward gear position for inhibiting (i.e., "blocking") movement to a reverse gear position, the shift inhibitor device also being operable for guiding the shift lever toward the "Neutral" position.

With particular reference to FIGS. 2 through 4, bottom views of shifter assembly 10 are shown which illustrate the various operational modes of shift inhibitor device 22. More particularly, shift inhibitor device 22 is shown to include a cam member 34 that is supported from a planar surface 36 of housing lug portion 30 for pivotable movement in response to neck segment 32 of shift lever 14 moving into engagement therewith. Preferably, cam member 34 is supported for pivotable movement about a pivot pin 38 and is normally biased to the "Home" position shown in FIG. 2 via a spring biasing arrangement. The biasing arrangement includes a spring member 40 having a coiled portion 42 and a pair of inter-crossed and laterally spaced legs 44 and 46. Coiled portion 42 of spring member 40 is retained on a first pin member 48 that extends transversely from planar surface 36 on housing lug 30. In addition, the spring biasing arrangement also includes a second pin member 50 that is fixed to planar surface 36 and a cam pin member 52 fixed to cam member 34. As seen, second pin member 50 and cam pin member 52 are retained between the laterally-spaced spring legs 44 and 46 and are linearly aligned with first pin member 48 when cam member 34 is in the "Home" position. A stop pin 54 is also fixed to planar lug surface 36 and is provided for limiting the magnitude of pivotable movement of cam member 34 in a first (i.e., counterclockwise) direction as will be described hereinafter in greater detail. In operation, cam pin member 52 is adapted to resiliently deflect one of legs 44 and 46 of spring member 40 in response to the particular direction of pivotable movement of cam member 34. As will be appreciated, leg members 44 and 46 are adapted to provide opposition to both clockwise and counterclockwise movement of cam member 34 for normally urging cam member 34 to the "Home" position shown in FIG. 2. It should be noted that the particular shape and positioning of biasing spring member 40 is merely exemplary and that other types of suitable spring members are considered to be within the scope of the present invention.

As best seen from FIGS. 2 and 3, linear movement of shift lever 14 along Neutral path 56 from a "Neutral" position (identified as "N") toward a first gate position causes neck segment 32 of shift lever 14 to engage a first camming surface 58 formed on the peripheral edge of cam member 34 for pivotably displacing cam member 34 in a second direction (i.e., clockwise in FIG. 3). Once neck segment 32 of shift lever 14 is aligned on a shift plane 60, the vehicle operator can subsequently move shift lever 14 into either of the highest forward ratio gear position (identified by the term "5th") or the reverse gear position (identified by the letter "R"). As can be seen, movement of neck segment 32 into engagement with first camming surface 58 causes cam pin 52 to resiliently deflect leg 44 of biasing spring 40 such that cam member 34 is caused to rotate to the position shown in FIG. 3, in opposition to the biasing force exerted by spring member 40. For exemplary purposes, the "Home" position of cam member 34 as well as the highest forward ratio gear position and reverse gear position are shown in phantom lines in FIG. 3.

Once the vehicle operator has completely shifted into either of the highest forward ratio gear position ("5th") or the reverse position ("R"), neck segment 32 no longer acts on cam member 34, whereby spring member 40 urges cam member 34 to return to the "Home" position. Thus, shift lever 14 can be freely shifted from Neutral path 56 along shift plane 60 to either of the gear positions without restriction. In addition, shift lever 14 can be moved without restriction from the reverse gear position ("R") to Neutral path 60 for subsequent movement to other forward gears, or directly to the highest forward gear position ("5th") along shift plane 60 via neck segment 32 acting on first camming surface 58 to rotate cam member 34 in the second direction.

With particular reference now to FIG. 4, the operation of shift inhibitor device 22 for inhibiting the vehicle operator from moving shift lever 14 from the highest forward gear position ("5th") directly into the reverse gear position ("R") will now be described. More particularly, when shift lever 14 is moved along shift plane 60 from the highest forward gear position ("5th") toward the reverse gear position ("R"), neck segment 32 of shift lever 14 engages a second camming surface 62 also formed on a peripheral edge of cam member 34. Such engagement causes cam pin 52 to outwardly deflect spring leg 46 such that cam member 34 rotates in the first (i.e., counterclockwise direction) from the "Home" position in opposition to the biasing force exerted by biasing spring 40. However, the magnitude of pivotable movement of cam member 34 in the first direction is limited by engagement of a stop surface 64 formed on cam member 34 with stop pin 54. Moreover, engagement between stop surface 64 and stop pin 54 is adapted to occur substantially concurrently with neck segment 32 of shift lever 14 being positioned on Neutral path 56, such that shift lever 14 is thereafter inhibited from continued axial movement along shift plane 60 toward the reverse gear position. Preferably, second camming surface 62 is generally configured as an arcuate surface which is adapted to guide shift lever 14 to move from shift plane 60 toward the Neutral position ("N") in response to stop surface 64 on cam member 34 engaging stop pin 54. Thus, shift inhibitor device 22 does not restrict the vehicle operator from shifting between the highest forward gear position and any of the other forward gear positions. Moreover, shift inhibitor device 22 also does not restrict movement of shift lever 14 between any of the remaining forward gear positions and the reverse gear position.

Figure 6:
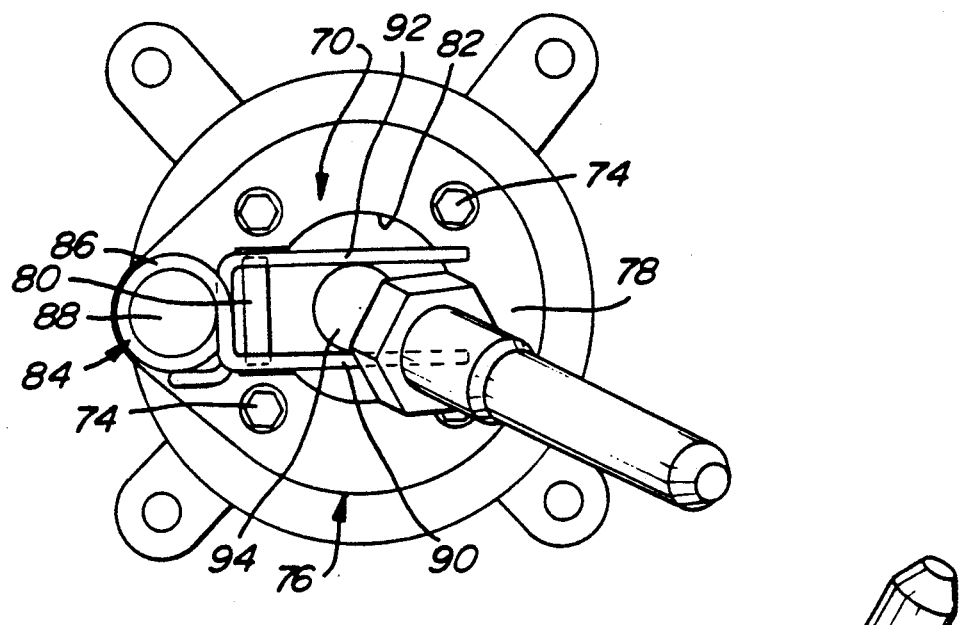
FIG. 6 is a top view, with some components removed, of the shift bias mechanism shown in FIG. 5.
Figure 5:
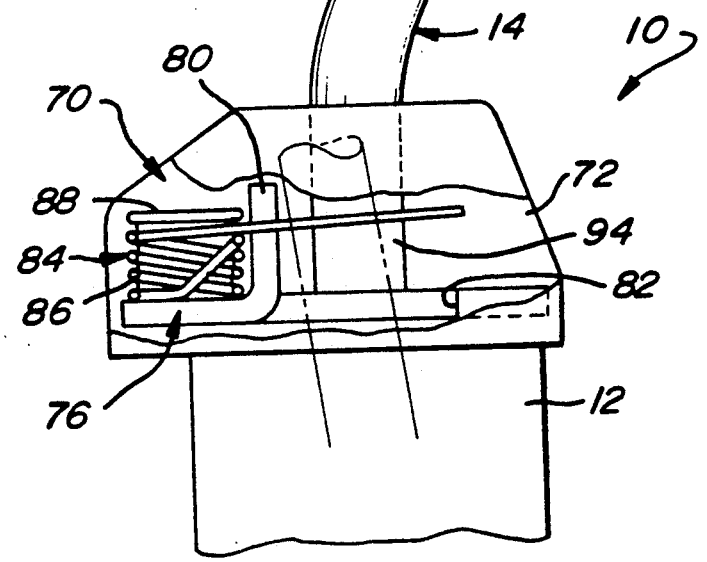
FIG. 5 is a cut-away view of a shift bias mechanism associated with an alternative embodiment of the shifter assembly.

With particular reference to FIGS. 5 and 6, an alternative embodiment of a shifter assembly is disclosed which has a shift lever bias mechanism 70 incorporated therein. In general, bias mechanism 70 is adapted to urge shift lever 14 to the above-referenced Neutral ("N") position along Neutral path 56 which generally is located in close proximity to a central gate position associated with a 3rd gear-4th gear shift plane. While bias mechanism 70 is preferably incorporated into shifter assembly 10 to cooperate with shift inhibitor device 22, it is contemplated that it may also be installed in shifter assemblies built without shift inhibitor device 22.

The advantage associated with bias mechanism 70 is that it is incorporated into shifter assembly 10 at a remote location from the gearshift mechanism where conventional biasing devices are typically located. Preferably, bias mechanism 70 is mounted on a planar external surface of housing 12 and is enclosed by a boot or cover member 72. More specifically, bias mechanism 70 is shown to include a mounting bracket 76 having an annular disc-like portion 78 that is fixed via suitable fasteners 74 to the planar housing surface. Bracket member 76 also includes an up-turned flange 80 formed adjacent a center aperture 82 through which a shaft portion 94 of shift lever 14 extends. A biasing spring 84 is provided for permitting relatively unrestricted lateral movement of shift lever 14 along the various above-noted shift planes while normally biasing shift lever 14 along Neutral path 56 to the centered Neutral ("N") position of FIG. 6.

According to the construction shown, biasing spring 84 includes a coiled portion 86 surrounding a pin member 88 fixed to disc-like portion 78 of mounting bracket 76, and a pair of inter-crossed and laterally-spaced legs 90 and 92. Legs 90 and 92 are generally parallel and are aligned to enclose flange 80 and shaft portion 94 of shift lever 14 therebetween. Thus, upon linear translational movement of shift lever 14 along Neutral path 56, shaft portion 94 engages one of spring legs 90 and 92 in response to the specific direction of such movement. Since spring legs 90 and 92 are resilient, they cooperate to oppose linear movement in either direction for normally urging shift lever 14 to the "Neutral" position shown in FIG. 6, wherein shaft portion 94 is linearly aligned with flange 80. As noted, shaft portion 94 of shift lever 14 is free to move within the space defined between legs 90 and 92 along the various shift planes. Thus, once the vehicle operator shifts out of a driven gear position, bias mechanism 70 is operable to urge shift lever 14 to move along the Neutral path 56 to the centered "Neutral" position.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A shifter assembly of the type operably coupled to a gearshift mechanism for permitting a vehicle operator to selectively shift between a plurality of ratio gear positions of a multi-speed manual transmission, comprising:

a housing secured to the transmission, said housing having a planar surface radially extending internal therefrom;

a shift lever supported for movement from said housing and having a first end coupled to the gearshift mechanism and a second end under the control of the vehicle operator for causing movement of the gearshift mechanism among various ratio gear positions, said shift lever having a predetermined portion adjacent to said planar surface of said housing but said planar surface not totally surrounding said predetermined portion of said shift lever; and shift inhibitor means for inhibiting movement of said shift lever from a first ratio gear position to a second ratio gear position along a shift plane defined by said first and second ratio gear positions, said shift inhibitor means including a cam member supported from said planar surface of said housing for pivotable movement with respect to a home position, said cam member having first cam surface means for causing movement of said cam member in a first direction from said home position in response to engagement with said shift lever for permitting movement of said shift lever to either of said first and second ratio gear positions, and second cam surface means for causing movement of said cam member in a second direction from said home position in response to movement of said shift lever from said first gear ratio position toward said second ratio gear position, said shift inhibitor means further including stop means engageable with said cam member in response to movement thereof in said second direction for preventing movement of said shift lever into said second ratio gear position; and biasing means for urging said cam member to return to said home position when said shift lever is in any of the ratio gear positions.

2. The shifter assembly of claim 1 wherein said shift inhibitor means further includes a first pin secured to said cam member and a second pin secured to said housing, said biasing means acting on said first and second pins such that said pins are aligned when said cam member is in said home position.

3. The shifter assembly of claim 2 further comprising a third pin secured to said housing, and wherein said biasing means comprises a spring member having a coiled portion retained on said third pin and a pair of laterally spaced leg members extending from said coiled portion and adapted to entrap said first and second pins therebetween.

4. The shifter assembly of claim 1 wherein said stop means includes a stop pin rigidly secured to said housing and engageable with a stop surface formed in said cam member for limiting rotation of said cam member in said second direction, whereby upon engagement of said stop surface with said stop pin said second cam surface means blocks continued movement of said shift lever along said shift plane toward said second gear ratio position while guiding said shift lever into a Neutral path intersecting said shift plane.

5. The shifter assembly of claim 4 wherein said first cam surface means is a first edge surface of said cam member such that when said shift lever is moved from a neutral position associated with said neutral path into said shift plane, said shift lever engages said first edge surface for forcibly rotating said cam member in said first direction in opposition to said biasing means.

6. The shifter assembly of claim 5 wherein said second cam surface means is a second edge surface of said cam member, whereby when shifting said shift lever from said second gear position toward said first gear position said shift lever engages said second edge surface for forcibly rotating said cam member in said second direction in opposition to said bias means, said second edge surface configured to allow said shift lever to enter said neutral path prior to said stop surface on said cam member engaging said stop pin for inhibiting further rotation of said cam member.

7. The shifter assembly of claim 6 wherein said second edge surface is arcuate for smoothly guiding said shift lever toward said neutral position along said neutral path during an attempt to shift from said second gear position to said first gear position.

8. The shifter assembly of claim 5 wherein said first edge surface is a flat edge for linearly guiding said shift lever during a shift from said first gear position.

9. The shifter assembly of claim 4 wherein said first ratio gear position defines a highest forward ratio gear position and said second ratio gear position defines a reverse gear position such that during a gear shift from said reverse gear position to any of said forward gears said shift lever engages said first cam surface means for causing rotation thereof in said first direction, whereby said shift lever is permitted to engage any of said forward gears or said neutral position after which said bias means urges said cam member to return to said home position.

10. The shifter assembly of claim 9 wherein during a gear shift from said highest forward gear position to said reverse gear position, said shift lever engages said second cam surface means which forcibly rotates said cam member in said second direction in opposition to said bias means, such rotation of said cam member being interrupted by said stop surface of said cam member engaging said stop pin at which time said shift lever is guided along said second cam surface means along said neutral path toward said neutral position.

11. A shifter assembly of the type operably coupled to a gearshift mechanism for permitting a vehicle operator to selectively shift between a plurality of ratio gear positions of a multi-speed manual transmission, comprising:
a housing secured to a casing which houses said transmission, said housing having a planar surface radially extending internal therefrom;
a shift lever supported for movement from said housing and having a first end coupled to the gearshift mechanism and a second end under the control of the vehicle operator for causing movement of the gearshift mechanism among various ratio gear positions, said shift lever having a predetermined portion adjacent to said planar surface of said housing but said planar surface not totally surrounding said predetermined portion of said shift lever;
a shift inhibitor preventing movement of said shift lever from a fifth gear position to a reverse gear position along a shift plane defined by said fifth and reverse gear positions, said shift inhibitor being supported from said planar surface of said housing and having a substantially horizontal orientation for preventive movement in a substantially horizontal plane therealong with respect to a home position, said shift inhibitor having a preselected portion engaging said shift lever and preventing said shift lever from traveling therepast into said reverse gear position, said shift inhibitor further urging said shift lever toward a neutral plane when said shift lever is moved from said fifth gear by said vehicle operator; and
at least one spring urging said shift inhibitor to return to said home position.

* * * * *